United States Patent [19]

Hutcheson et al.

[11] Patent Number: 5,551,058
[45] Date of Patent: Aug. 27, 1996

[54] METHOD AND SYSTEM FOR INTELLIGENT CELL SELECTION USING LOCATION DATA IN CELLULAR SYSTEMS

[75] Inventors: Jonathan E. Hutcheson, Tempe; Kadathur S. Natarajan, Mesa; Raymond J. Leopold, Tempe, all of Ariz.

[73] Assignee: Motorola, Inc., Schaumburg, Ill.

[21] Appl. No.: 331,463

[22] Filed: Oct. 31, 1994

[51] Int. Cl.$^6$ ............................................. H04Q 7/00
[52] U.S. Cl. ....................... 455/33.2; 455/33.1; 455/54.1
[58] Field of Search ........................... 455/12.1, 13.1, 455/33.1, 33.2, 33.4, 34.1, 34.2, 54.1, 56.1, 62; 379/59, 60

[56] References Cited

U.S. PATENT DOCUMENTS

| | | | |
|---|---|---|---|
| 5,095,500 | 3/1992 | Tayloe et al. | 379/59 |
| 5,161,248 | 11/1992 | Bertiger et al. | 455/33.2 |
| 5,212,822 | 5/1993 | Fukumine | 455/33.2 |
| 5,239,667 | 8/1993 | Kanai | 455/33.2 |
| 5,379,447 | 1/1995 | Bonta et al. | 455/33.2 |
| 5,386,589 | 1/1995 | Kanai | 455/33.1 |
| 5,394,561 | 2/1995 | Freeburg | 455/33.2 |
| 5,432,521 | 7/1995 | Siwiak | 455/12.1 |
| 5,432,843 | 7/1995 | Bonta | 455/33.2 |
| 5,436,956 | 7/1995 | Shiotsuki et al. | 455/33.2 |
| 5,450,473 | 9/1995 | Shiotsuki et al. | 455/33.2 |
| 5,455,964 | 10/1995 | Roos et al. | 455/54.2 |

FOREIGN PATENT DOCUMENTS

| | | | |
|---|---|---|---|
| WO093000777 | 1/1993 | WIPO | 455/54.1 |

*Primary Examiner*—Reinhard J. Eisenzopf
*Assistant Examiner*—Marsha D. Banks-Harold
*Attorney, Agent, or Firm*—Kevin K. Johanson

[57] ABSTRACT

A cellular communication system projects multiple cells throughout a user area. Subscriber units (24) encounter multiple cells as they roam through the user area or as the cells migrate past the subscriber unit (24). When a subscriber unit (24) encounters the fringe area of a cell it must select and transition to a target cell to maintain contact with the system. The subscriber unit (24) performs an analysis of the location, proximity, and expected duration of exposure of candidate target cells using location data transmitted by control channels located in the candidate cells. The subscriber unit (24) then selects a target cell based on these factors.

22 Claims, 5 Drawing Sheets

METHOD AND SYSTEM FOR INTELLIGENT CELL SELECTION USING LOCATION DATA IN CELLULAR SYSTEMS

RELATED INVENTIONS

The present invention is related to the following inventions which are assigned to the same assignee as the present invention:

Method And System For Intelligent Cell Selection Using Doppler Data In Cellular Systems, Ser. No. 08/31,461; filed concurrently herewith and assigned to the assignee of the present invention.

TECHNICAL FIELD

This invention relates generally to cellular communications systems and, in particular, to methods and systems for selecting target cells used by subscriber units in performing cell-to-cell transitions, and performing initial cell selection.

BACKGROUND OF THE INVENTION

A cellular communications system projects any number of cells over the earth at diverse locations. A spectrum is allocated in frequency, in time, by coding, or a combination of these, to the cells so that communications taking place in nearby cells use different channels to minimize the chances of interference. On the other hand, communications taking place in cells located far apart may use the same channels, and the large distance between communications in common channels prevents interference. Over a large pattern of cells, a frequency spectrum is reused as much as possible by distributing common channels over the entire pattern enabling distant cells to reuse the same spectrum. An efficient use of spectrum results without interference.

One problem which cellular communications systems address is the transitioning of communications between cells, as well as the selection of an initial cell. Relative movement between end users and cells causes the end users and the communication links directed thereto to move between cells. In order to permit continuous communications in an ongoing call, the system must "handoff" an in-process call when the end user crosses a cell boundary. If a call is not handed-off to a new cell upon leaving an old cell, the call will eventually be lost because the strength of signals over which communications take place would diminish to a point where the system's radio equipment cannot receive the end user's transmissions, or vice versa.

Servicing cell determination must also be performed when a subscriber unit transitions to a new cell in order to be able to receive or initiate communications. In servicing cell determination, a subscriber unit informs the system of the new cell through which to route any communications to the subscriber unit.

Conventional cellular communications systems address the transition problem (e.g., handoff and servicing cell determination) by monitoring and comparing signal strength. A currently used channel associated with one cell may be monitored and compared by a subscriber unit in another cell. Communications are then passed off to the cell with the stronger signal.

The conventional transition technique may work adequately when the distances between subscriber units and system transceivers are relatively small, when the speeds of movement between cells and subscriber units are slow, and when transitions are relatively evenly distributed in time.

Historically, such conditions existed for conventional terrestrial cellular systems. In such systems cells did not move with respect to the earth, and the movement between cells and subscriber units resulted from subscriber unit movement in accordance with conventional modes of transportation. However, as traditional cells become congested and are sub-divided into micro-cells, transitions occur more frequently.

Also in satellite cellular systems, where radio equipment is located on satellites orbiting the earth in moving orbits, transitions between cells are also frequent, and the conventional transition techniques may be inadequate.

For example, orbiting satellites are located a relatively large distance from subscriber units, often on the order of several hundred kilometers. The smaller this distance, the greater the speed of the satellite relative to a particular position on the earth. Speeds of over 20,000 km/hr are typical. This fast movement relative to a subscriber unit introduces widely and rapidly varying propagation delays and Doppler frequency offsets into signals transmitted between a satellite and a subscriber unit.

As a mobile subscriber moves from one cell to another cell, a transition procedure is employed. The gateway or switching network indicates to the mobile subscriber to change frequencies from a channel which was used in the first cell to a new frequency of a new channel used in the second cell.

Because there are a number of contiguous cells to which a mobile subscriber may travel, a method for determining into which cell the subscriber is to transition is required. If the subscriber is transitioned into an incorrect cell with a new frequency, the mobile subscriber's call will become lost and disconnected, or calls directed to or originated from the subscriber will be undeliverable. Such transition decision making is typically accomplished by measuring the amplitude of the signal received from the mobile subscriber. One such terrestrial cellular telephone system is shown in U.S. Pat. No. 4,654,879, issued on Mar. 31, 1987, to S. Goldman.

Modern terrestrial cellular systems, using higher frequencies for communications, improve the detectability of relative motion between subscriber units and transceivers. Also in satellite cellular systems, the cells projected on the earth are much larger than those of the terrestrial systems. In addition, the satellite moves quite rapidly and as a result, subscribers must be transferred from one cell to the next much more often than in terrestrial systems.

Accordingly, it is an advantage of the present invention to provide a method for selecting target cells using location data in servicing cell determination and handoffs in a cellular communication system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
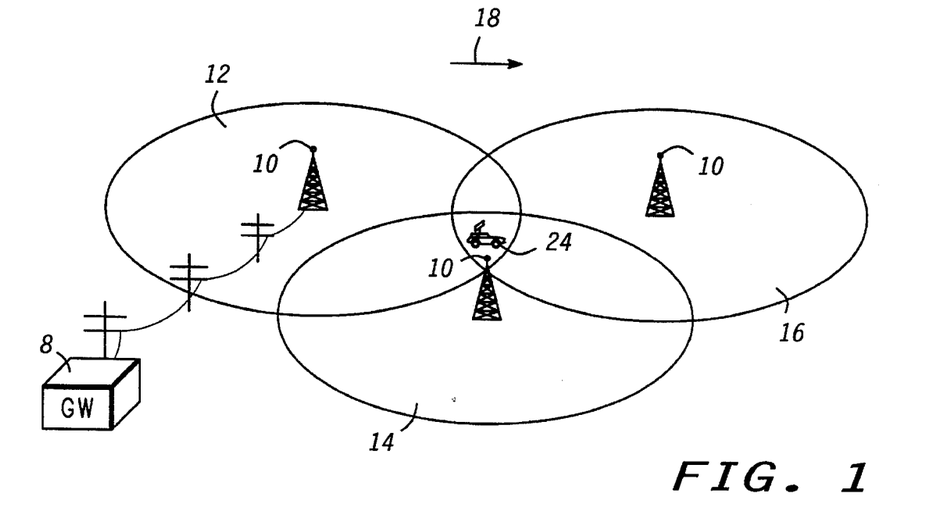
FIG. 1 shows a diagram of a terrestrial cellular communications system within which the present invention may be practiced.

FIG. 1 shows a diagram of a terrestrial cellular communications system within which the present invention may be practiced. A gateway 8 interfaces between conventional telephony infrastructure and a cellular system. Gateway 8 may interface to the public switched telephone network or any other communications system. Gateway 8 also includes cellular system planning functions such as call termination routing instructions, and other system planning functions including generation of control channel lists for delivery to subscriber units 24.

As subscriber unit 24 commutes throughout a cellular system, it passes through multiple beams. Subscriber unit 24 must select a target cell between possibly many choices. Subscriber unit 24 must select a target cell upon first arriving or powering-on in a system. Target cell selection during such a non-communication period is known as "servicing cell determination" although servicing cell determination as known in the art may involve additional functionality (i.e., location reporting, etc.) which is beyond the scope of this invention.

Subscriber unit 24 must also select a target cell upon roaming while communicating in a cellular system. Selection of a cell during communications is known as a "handoff". Handoff concepts, as known in the art, also have broader functionality not described in this invention.

Each terrestrial transceiver 10 projects a cell about itself using non-adjacently interfering frequencies or channels. The cells projected by terrestrial transceivers 10 need not be regularly shaped and are shown as circular patterns for convenience. The particular shape of the cell is not important for this invention. Each cell transmits a control channel which may contain a variety of information such as location of available communications channels, cell footprint or location information, time of day, cell identification, etc. Each control channel is specific to that cell, and information from an individual control channels may be used to discriminate and evaluate the desirability of each cell.

Subscriber unit 24, as shown in FIG. 1, resides in cell 12. Subscriber unit 24 has a computing means and a transceiving means for executing the method described herein. Transceiving and computing means are well known in the art consisting of microprocessors, memories, transmitters, receivers, synthesizers, timers, etc.. As subscriber unit 24 continues traveling in direction 18, subscriber unit 24 eventually reaches the fringes of cell 12 as shown. Subscriber unit 24 detects this by noting a decrease in signal quality or other monitorable characteristic such as a range or distance from the cell origin. Subscriber unit 24 begins selecting a target cell. As is shown in FIG. 1, subscriber unit 24 may be located within both non-servicing cells 14 and 16, with each having a sufficient signal quality. Subscriber unit 24 begins evaluating control channels as transmitted by terrestrial transceivers 10 in cells 14 and 16.

Unnecessary transfers to interim cells in cellular systems expends resources, such as power and bandwidth, and may lead to loss of communications through mis-routed data, or rapidly declining signal coverage. Also, unnecessary delays may result from scheduling and performing switching transactions. As shown in FIG. 1, selection based solely on signal quality by subscriber unit 24, may result in the selection of cell 14. However, cell 14 would be entirely an interim cell while selection of cell 16 would provide service for an extended period of time.

Terrestrial transceivers 10 transmit control channels that broadcast location data defining the position of a cell. As shown in FIG. 1, transceiver 10 transmits location data within cell 12. This location data may be coordinates of the center of the cell, peripheral boundaries, or any descriptive designation of cell 12.

Figure 2:
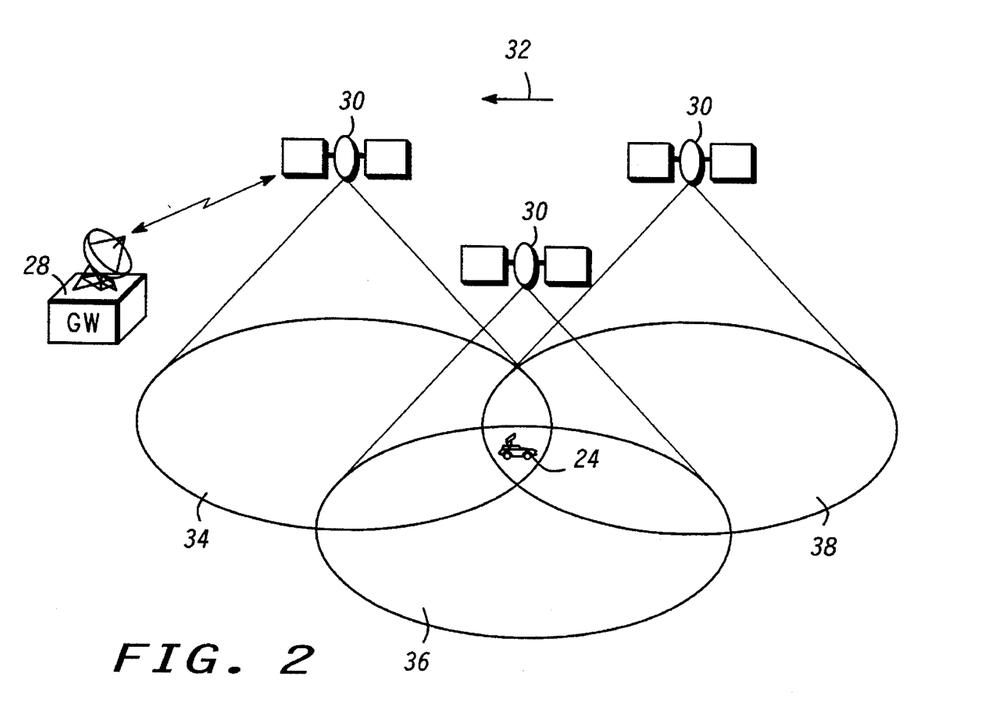
FIG. 2 shows a diagram of a satellite cellular communications system within which the present invention may be practiced.

FIG. 2 shows a diagram of a satellite cellular communications system within which the present invention may be practiced. A gateway 28 interfaces between a conventional telephony infrastructure and a cellular system. Gateway 28 may interface to the public switched telephone network or any other communications system. Gateway 28 also includes cellular system planning functions such as call termination routing instructions, and other system planning functions including generation of control channel lists for delivery to subscriber units 24. Each satellite transceiver 30 orbits in direction 32 while projecting a cell upon the earth. Subscriber unit 24 must select a target cell between possibly many choices. As discussed above, subscriber unit 24 must select a target cell upon registration or during handoffs. Each satellite transceiver 30 projects a single cell or multiple cells (FIG. 3) upon the earth. Satellite transceiver 30 broadcasts a unique control channel in each cell.

Satellite transceiver 30, like terrestrial transceiver 10 (FIG. 1), transmit unique control channels into each cell. These control channels contain location data describing the geometry of the specific cell. Satellite transceiver 30 generates cell 34 containing a unique control channel. The control channel contains location data describing cell characteristics and location information specific to cell 34's present location. Such location data may be in the form of cell center, offset from satellite ground track, peripheral coordinates, or many other descriptive forms of location data. An embodiment of the present invention utilizes location data in performing cell selection of a target cell.

Subscriber unit 24, as shown in FIG. 2, resides in cell 34. As satellite transceiver 30 continues to orbit in direction 32, subscriber unit 24 eventually reaches the fringes of cell 34 as shown. Subscriber unit 24 detects this by noting a decrease in signal quality or other monitorable characteristic such as a change in range or distance from the cell origin. Subscriber unit 24 begins selecting a target cell. As is shown in FIG. 2, 20 subscriber unit 24 may be located within both cells 36 and 38, with each having a sufficient signal quality. Subscriber unit 24 evaluates control channels as transmitted by satellite transceivers 30 in cells 36 and 38.

Figure 3:
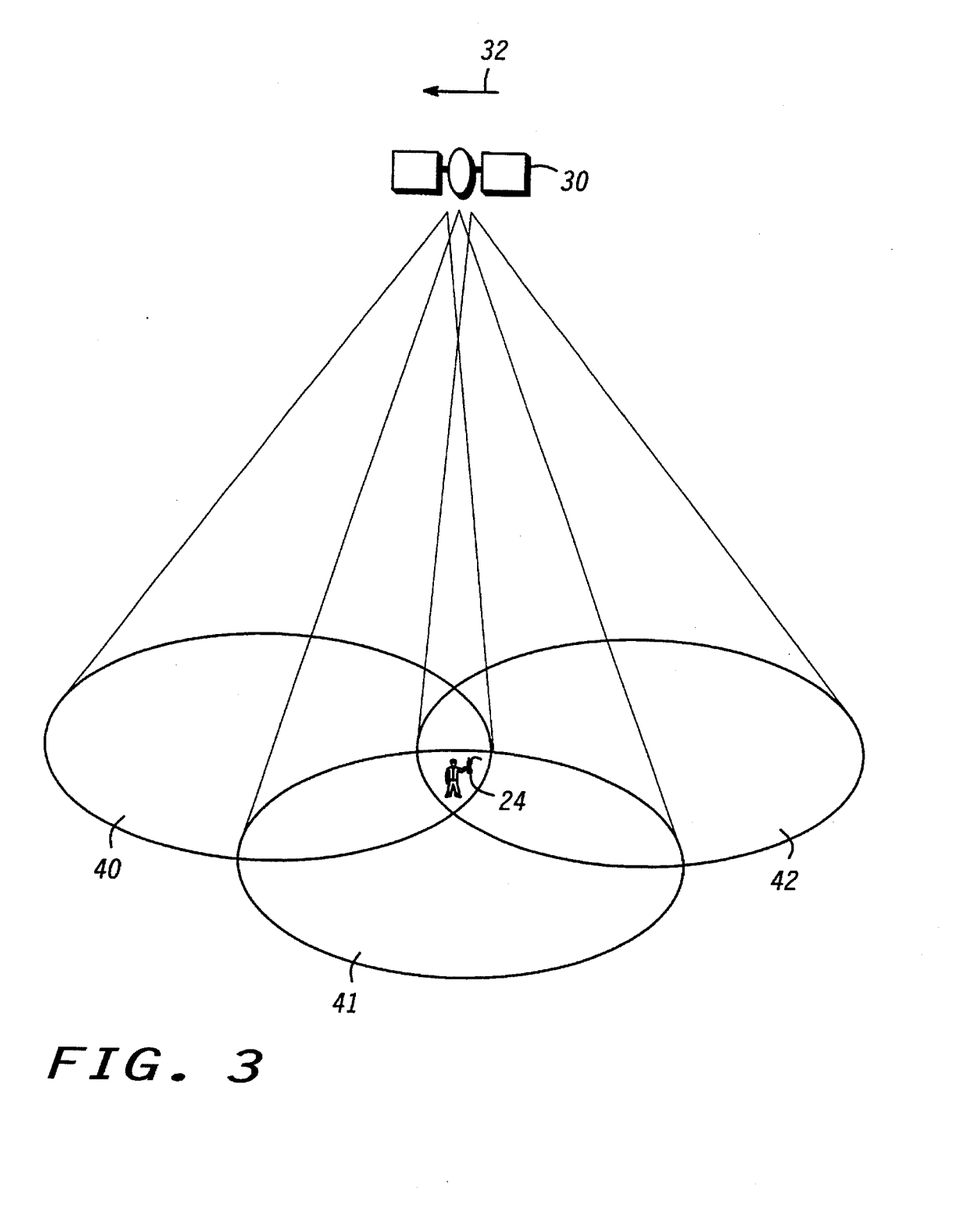
FIG. 3 shows a diagram of cellular projections of multiple cells from a satellite about a subscriber unit, in accordance with a preferred embodiment of the invention.

FIG. 3 shows a diagram of cellular projections of multiple cells from a satellite about a subscriber unit, in accordance with a preferred embodiment of the invention. Satellite transceiver 30 orbits in direction 32 while projecting a plurality of cells 40, 41, and 42 upon the earth. Subscriber unit 24 must select a target cell among several available candidates. Satellite 30 broadcasts a unique control channel in each cell.

Subscriber unit 24 performs cell selection by using location data methods. It should be noted that for an intraosatellite transfer to a target cell as shown in FIG. 3, Doppler frequencies between intra-satellite cells are equivalent. In such situations, a location data method must be employed to select a target cell as Doppler differences are equivalent.

In the present invention, subscriber units perform a target cell selection method similarly for satellite transceivers projecting single or multiple cells.

Figure 4:
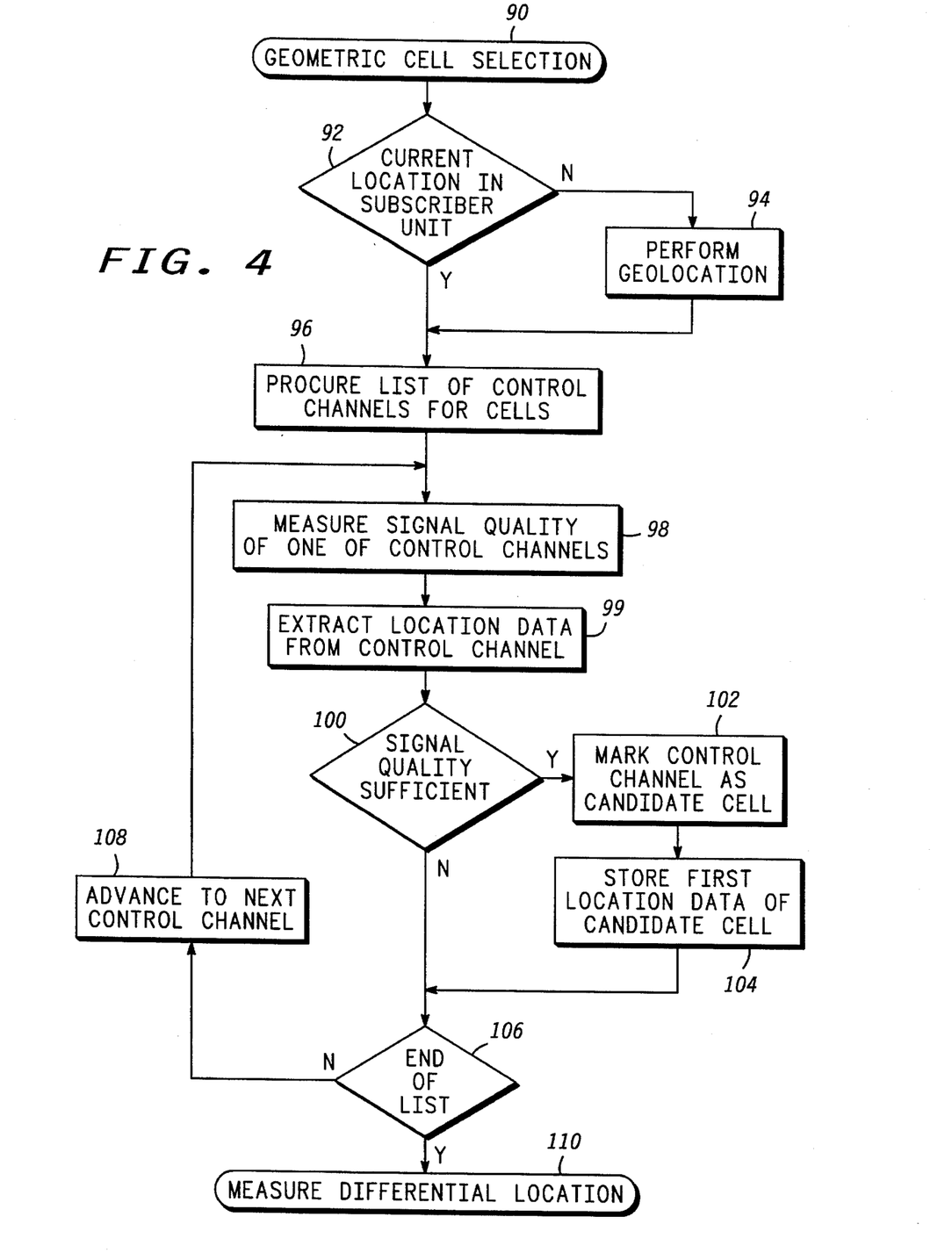
FIGS. 4–6 show flowcharts for a method of target cell selection using location and signal quality data, in accordance with a preferred embodiment of the invention.
Figure 5:
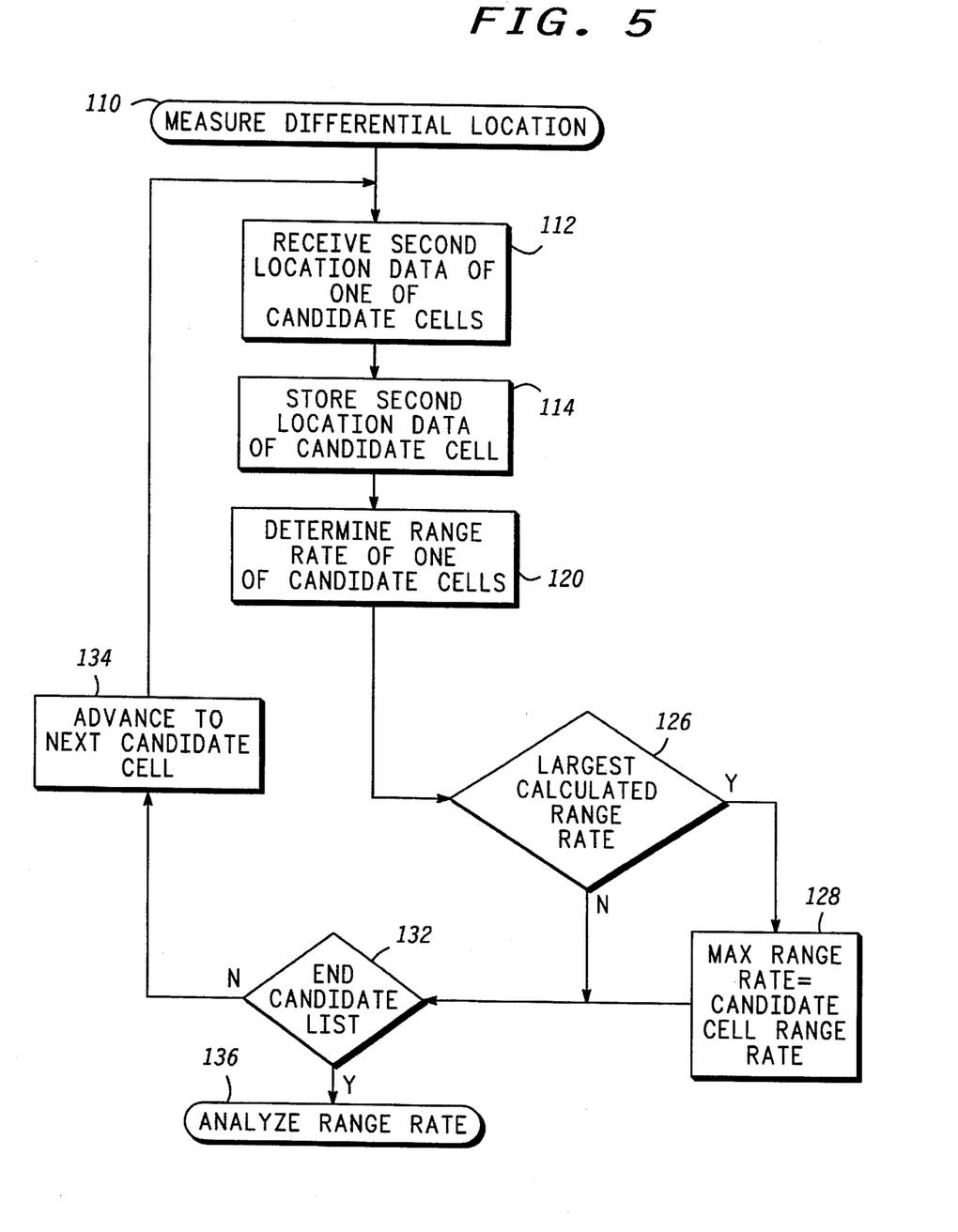
Figure 6:
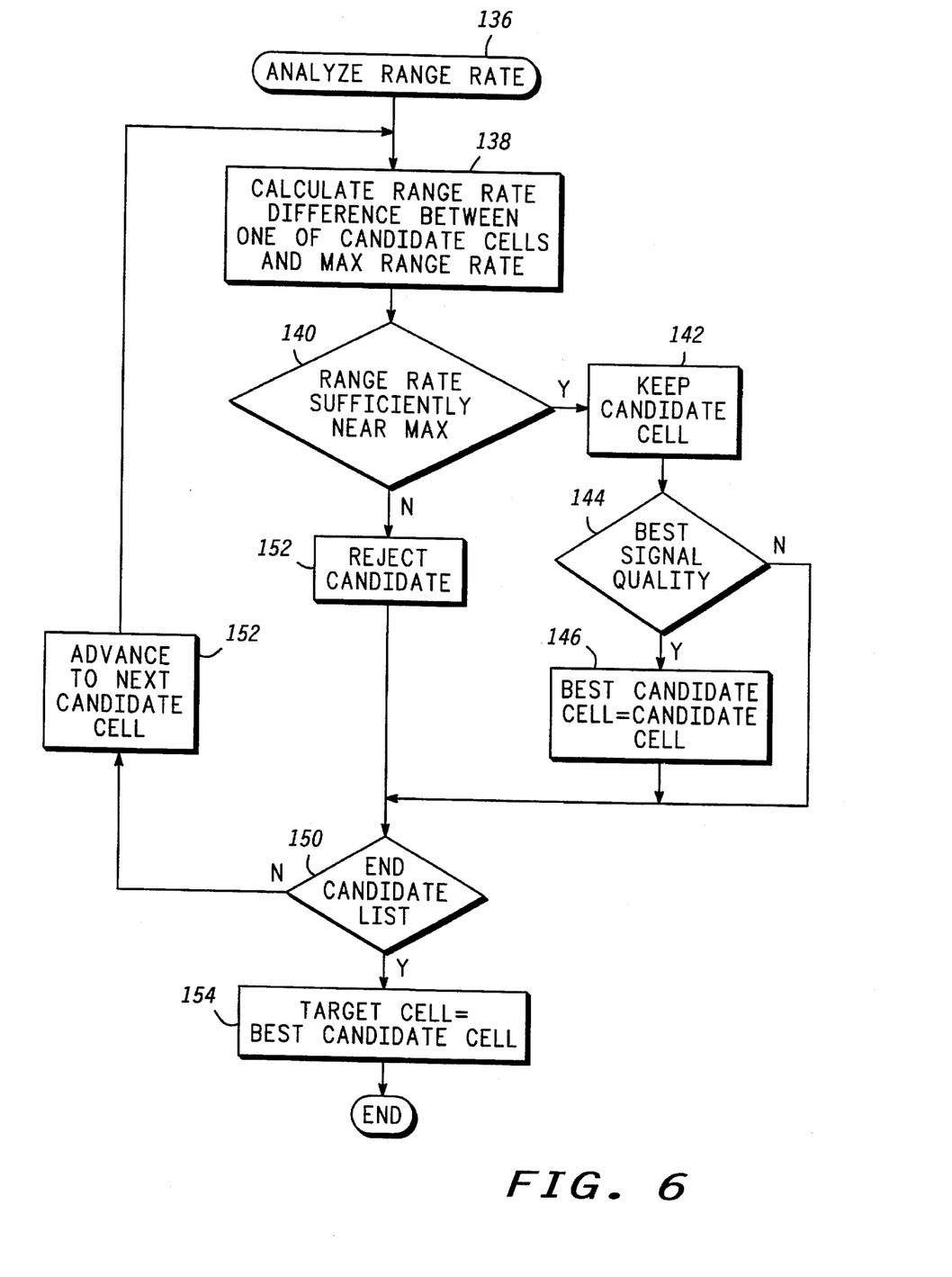

FIGS. 4–6 show flowcharts for a method of target cell selection using location and signal quality data, in accordance with a preferred embodiment of the invention. This method selects target cells using a subscriber unit's current location in relation to location data and signal quality data associated with candidate cells.

Cellular communication systems require location information in order to efficiently route communications to subscriber units 24. Because of the autonomous and mobile nature of subscriber units, a communication systems allocates selection of target cells to individual subscriber units. Subscriber units can best evaluate electromagnetic propagation characteristics of individual cells. As subscriber units roam in a cellular system, they must continue to evaluate cells for improved communications.

As communications quality in subscriber unit 24's servicing cell diminishes, subscriber unit 24 initiates a Geometric Cell Selection method 90. Method 90 evaluates location data and signal quality emanating from transceivers 10 or 30.

A query task 92 examines current location data of subscriber unit 24, if any data exists. If a subscriber unit geographic location is not present or if it is stale, then a task 94 acquires new data. Subscriber unit 24 uses either internal or external geolocation techniques. Acquisition of current location data is well known in the art.

Following the completion of task 92 or 94, a task 96 retrieves a list of control channels for evaluation by subscriber unit 24. As discussed above, a control channel list may have arrived at subscriber unit 24 from several sources. A list may have been installed upon subscriber unit configuration, delivered by the system in an earlier transmission, or defined by cellular frequency reuse patterns. A control channel list contains identifiers of potential target cells. Identification may be frequency or channel identifiers known by subscriber unit 24.

In a task 98, subscriber unit 24 begins analyzing the signal quality of one of the members of a control list. Subscriber unit 24 receives a sample of a control channel and analyzes the signal quality. This analysis may use received power level, Bit Error Rate (BER) analysis or any known signal quality evaluation technique.

A task 99 extracts location data from the control channel currently under evaluation. This location data defines characteristics of the cell wherein the control channel is transmitted. As discussed above, this location data may define a central location of a cell or other characteristics such as peripheral coordinates.

Query task 100 compares the received control channel sample against a threshold value known by subscriber unit 24. The comparison threshold value may be defined by the system or dynamically adjusted by a subscriber unit 24 to maintain reliable communications.

If the signal quality is sufficient to warrant additional observation, then subscriber unit 24, in a task 102, notes the 20 control channel under evaluation as a candidate cell and, as such, will receive additional evaluation. A task 104 stores the first location data describing the candidate cell associated with the control channel under evaluation.

Upon completion of either task 104, or an insufficient signal quality measurement in task 100, a query task 106 evaluates the completion of sampling each control channel on the control channel list.

If the complete list has not been sampled, then a task 108 advances analysis to the next member of the control channel list and proceeds to task 98 where analysis continues as described above. Upon completion of the analysis of all members of the control channel list, processing proceeds to a Measure Differential Location procedure 110 as shown in FIG. 5.

In FIG. 5, a task 112 collects an updated location of a candidate cell from the list created in task 102. At a subsequent time, subscriber unit 24 monitors a control channel of a candidate cell and receives the location data associated with that cell. This subsequent sample displays any diversity of location or change in positional relationship between a subscriber unit and a transceiver. A task 114 stores a second location data describing a candidate cell associated with the control channel under evaluation.

In a task 120, subscriber unit 24 calculates a range rate using a first and a second location data. This range rate represents the rate at which a transceiver 10 or 30 is approaching subscriber unit 24 or receding from it.

A query task 126 evaluates the calculated range rate of candidate cells retained in task 102. This task compares the range rate of the control channel currently being analyzed with the best of the cells evaluated thus far. This task utilizes the calculation made in task 120. If this is the first control channel to be evaluated in this step, then task 128 will retain the calculated range rate as the benchmark used to compare remaining control channels.

Upon completion of either task 126, or 128, a query task 132 assesses the completion of the testing of each candidate on the list. If the complete list has not been sampled, then a task 134 advances analysis to the next member of the candidate control channel list. Completion of the analysis of the entire control channel list then proceeds to an Analyze Range Rate procedure 136 as shown in FIG. 6.

In FIG. 6, the list of candidate cells as established in task 102 (FIG. 4) receives further evaluation. A task 138 tests the proximity of a candidate cell's range rate to the maximum range rate as found above in tasks 126 and 128 (FIG. 5).

A query task 140 evaluates the proximity of a candidate cell's range rate to the maximum range rate. Candidate cells falling outside a proximity threshold value are dismissed in task 148.

Cells meeting a range rate threshold of task 140 are retained by a task 142. Ideally, the best candidate cells are those that have adequate signal quality and are most distant and approaching. However, shadowing and attenuation of signals due to subscriber unit surroundings often dictates selection of nearer cells or even a receding transceiver or satellite.

A query task 144 evaluates the signal quality of candidate cells retained by task 142. This task determines if the signal quality of the control channel currently being analyzed is the best of the cells evaluated thus far. This task utilizes the measurements taken in task 98 (FIG. 4), or additional measurements may be taken if desired. If this is the first control channel to be evaluated in this step, then a task 146 will retain the measured signal quality as the benchmark used to compare remaining control channels from the further refined candidate list.

Upon completion of either tasks 148, 144, or 146, a query task 150 assesses the completion of testing of the candidate list. If the entire list has not been sampled, then a task 152 advances analysis to the next member of the candidate control channel list.

When the entire candidate list has been examined, a task 154 assigns the candidate cell having the best signal quality from task 146 as the target cell. The selection process is then complete. Subscriber unit 24 then proceeds to request the target cell as its new servicing cell. This request process is outside the scope of this invention; however, it generally follows a servicing cell determination or handoff process as described earlier.

In an alternative embodiment, tasks 144 and 146 may prioritize candidate cells and forward a series of prioritized candidate cells to task 154. A cell selection method may then forward this prioritized candidate list for use in requesting specific servicing cells.

It will be appreciated that the present invention therefore provides an improved method and system of selecting target cells in a cellular communication system. Additional cell specific information is analyzed to produce a more intelligent selection of a target cell.

Additionally, the present invention reduces the system overhead burden by intelligently selecting target cells to minimize cell transitions and therefore minimize system overhead associated with processing and confirming transition requests.

Additionally, by reducing the number of servicing cell determinations or handoffs in a communication system, the present invention reduces the probability of communication interruptions due to dropped communications during target cell transitions.

Furthermore, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of selecting a target cell for handing off a subscriber unit in a cellular communication system, said system having a plurality of transceivers projecting cells upon the earth, said method comprising the steps of:
   (a) procuring a list of at least one control channel for evaluation within said subscriber unit;
   (b) measuring a signal quality as received at said subscriber unit for one of said at least one control channel;
   (c) extracting a location data of said at least one control channel having sufficient signal quality;
   (d) retaining said location data for said at least one control channel in a group of candidate cells when said signal quality exceeds a signal quality threshold value;
   (e) repeating steps (b) thru (d) for each of said at least one control channel;
   (f) ordering said group Of candidate cells according to a range rate derived from said location data; and
   (g) selecting said target cell from said group of candidate cells.

2. A method as recited in claim 1, wherein step (a) further comprises the step of receiving at said subscriber unit said list of said control channels from said system.

3. A method as recited in claim 1, wherein said list in step (a) comprises searching all known control channels.

4. A method as recited in claim 1, wherein said list in step (a) comprises searching said control channels assigned for use in adjacent cells.

5. A method as recited in claim 1, wherein step (b) comprises the step of measuring a bit error rate of one of said control channel for determining said signal quality.

6. A method as recited in claim 1, wherein step (b) comprises the step of measuring a power level of one of said control channels for determining said signal quality.

7. A method as recited in claim 1, wherein step (d) comprises the steps of:
   (d1) receiving a first geographic location for each of said control channels;
   (d2) waiting a delay period of time for said subscriber unit and said transceiver to diversify in location; and
   (d3) receiving a second geographic location for each of said control channels.

8. (Amended) A method as recited in claim 7, wherein steps (f) and (g) comprise the steps of:
   (f1) retrieving a subscriber unit geographic location stored within said subscriber unit;
   (f2) comparing said first and said second geographic locations of each of said control channels with said subscriber unit geographic location; and
   g3 selecting one of said candidate cells approaching said subscriber unit and having the greatest approaching range rate from said subscriber unit.

9. A method as recited in claim 8, wherein step (f2) comprises the steps of:
   (f21) prioritizing said candidate cells according to signal quality; and
   (f22) selecting a plurality of said candidate cells having sufficient signal quality, said plurality of candidate cells forming a priority list for requesting target cells.

10. A method as recited in claim 7, wherein steps (f) and (g) comprise the steps of:
    (f11) retrieving a subscriber unit geographic location stored within said subscriber unit;
    (f12) comparing said first and said second geographic locations of each of said control channels with said subscriber unit geographic location;
    (f13) discarding said candidate cells not having a range from said subscriber unit greater than a threshold value; and
    (g14) selecting one of said candidate cells having best signal quality.

11. A method as recited in claim 1, wherein said transceivers are orbiting satellites.

12. A method as recited in claim 1, wherein each of said transceivers projects a plurality of said cells upon the earth.

13. A method as recited in claim 1, wherein said transceivers are located on the earth.

14. A method of selecting a target cell for a subscriber unit in a cellular communication system, said system having a plurality of transceivers projecting a plurality of cells upon the earth, said method comprising the steps of:
    (a) procuring a list of control channels for searching;
    (b) measuring a signal quality of one of said control channels from said list, said control channel containing a first location data for describing said candidate cell;
    (c) comparing said signal quality of said control channel with a threshold value;
    (d) retaining said one of said control channels as a candidate cell when said signal quality exceeds said threshold value;
    (e) storing said first location data;
    (f) repeating steps (b) through (e) for each of said control channels of said list;
    (g) measuring a signal quality of one of said control channels from said candidate list, said control channel containing a second location data for describing said candidate cell;
    (h) storing said second location data;

(i) repeating steps (g) through (h) for each of said control channels of said list;

(j) selecting a group of advancing cells from said candidate channels by comparing said first and said second locations; and (k) selecting said target cell from said group of advancing cells, said target cell having the best signal quality of said group.

15. A method as recited in claim 14 wherein step (a) further comprises the step of performing a geolocation process to update a subscriber unit geographic location.

16. A cellular communications system with target cell selection using location data, said system comprising:

a subscriber unit for measuring a signal quality as received at said subscribor unit for at least one control channel, extracting said location data of said at least one control channel having sufficient signal quality, retaining said location data for said at least one control channel in a group of candidate cells when said signal quality exceeds a signal quality threshold value, ordering said group of candidate cells according to a range rate derived from said location data, and selecting said target cell from said group of candidate cells;

a plurality of transceivers projecting cells upon the earth, said transceivers and said subscriber units being in relative motion so as to generate a diversity in said location data; and a gateway for interfacing telephony communications with cellular infrastructure.

17. A cellular communications system as recited in claim 16, wherein said transceivers are orbiting satellites.

18. A cellular communications system as recited in claim 16, wherein each of said transceivers projects a plurality of said cells upon the earth.

19. A cellular communications system as recited in claim 16, wherein said transceivers are located on the earth.

20. A subscriber unit for selecting a target cell for handing off in a cellular communications system, said subscriber unit comprising:

transceiver means for receiving a plurality of control channels from a plurality of cell transceivers;

means for measuring a signal quality as received at said subscriber unit for at least one control channel;

means for extracting location data as received at said subscriber unit for said at least one control channel having sufficient signal quality;

means for retaining said location data for said at least one control channel in a group of candidate cells when said signal quality exceeds a signal quality threshold value;

means for ordering said group of candidate cells according to a range rate derived from said location data; and means for selecting said target cell from said group of candidate cells.

21. A subscriber unit as recited in claim 20, wherein said subscriber unit further comprises a means for storing a list of said control channels.

22. A subscriber unit as recited in claim 20, wherein said subscriber unit further comprises a means for measuring signal quality as received at said subscriber unit for said at least one control channel.

* * * * *